United States Patent [19]

Saitta

[11] Patent Number: 4,550,304
[45] Date of Patent: Oct. 29, 1985

[54] SYSTEM FOR SIGNALLING CONDITIONS OF, INCLUDING AN EMERGENCY WITHIN, A VEHICLE

[76] Inventor: Joseph P. Saitta, 2160 Washington St., Merrick, N.Y. 11566

[21] Appl. No.: 474,177

[22] Filed: Mar. 10, 1983

[51] Int. Cl.[4] .............................................. B60Q 1/00
[52] U.S. Cl. ....................................... 340/84; 340/87; 340/50; 340/68; 340/78
[58] Field of Search ............. 340/84, 87, 68, 110–112, 340/50, 78, 103, 931

[56] References Cited

U.S. PATENT DOCUMENTS

| | | | |
|---|---|---|---|
| 1,857,210 | 5/1932 | Nelson et al. | 340/112 |
| 2,029,211 | 1/1936 | Adler | 340/931 |
| 2,478,178 | 8/1949 | Brasington et al. | 340/50 |
| 2,814,028 | 11/1957 | Hamilton | 340/68 |
| 3,349,280 | 10/1967 | Siiberg | 340/84 |
| 3,786,414 | 1/1974 | Dressayre | 340/78 |
| 4,259,664 | 3/1981 | Boisclair | 340/63 |
| 4,384,271 | 5/1983 | Visser | 340/87 |

Primary Examiner—John W. Caldwell, Sr.
Assistant Examiner—Tyrone Queen
Attorney, Agent, or Firm—Fitzpatrick, Cella, Harper & Scinto

[57] ABSTRACT

A system for signalling conditions of, including an emergency within, a vehicle comprises a main housing mountable on the vehicle at a location visible from substantially all lateral points. A warning light is mounted within the housing and light which it generates is projected from the housing by an optical system as a plurality of substantially collimated beams each of which is oblique with respect to the major axis of the vehicle. A switch for actuating the warning light is located within the vehicle for unobtrusive operation. The system also includes additional signal lights for signalling different conditions of the vehicle and circuitry which prevents simultaneous operation of certain of the signal lights that have contradictory meanings.

27 Claims, 5 Drawing Figures

SYSTEM FOR SIGNALLING CONDITIONS OF, INCLUDING AN EMERGENCY WITHIN, A VEHICLE

BACKGROUND OF THE INVENTION

1. Field of the Invention

The present invention relates to a system for signalling conditions of a vehicle. More particularly, the invention relates to a system for signalling an emergency within a vehicle and for signalling various of its other conditions or states if it is, for example, a commercial one such as a taxicab.

In recent years operators of commercial vehicles such as taxicabs have become increasingly more common targets for robbery, assault and other violent crimes. Typically, a criminal posing as an ordinary passenger will enter the rear seat of a taxicab and then rob or otherwise threaten the driver in the front seat who, of necessity, faces away from his passengers a large portion of the time. Since the driver is in a poor position to defend himself against such an attack, it is desirable to provide him or her with a system for attracting assistance in these instances.

The driver of any type of vehicle also may have a medical emergency that requires attention. And the vehicle can break down without warning. While these occurrences are not as menacing as a criminal attack, the driver nevertheless can benefit from a simple means for attracting attention to his or her vehicle and thereby obtaining assistance in such cases.

In addition, it is desirable that commercial vehicles such as taxicabs have a convenient mechanism for clearly signalling their commercial condition at any time. For example, most taxicabs may be "available for hire", "off-duty", or "on radio call", and is it desirable for the driver to be able to unambigously signal these conditions to those outside of his or her cab. It is also desirable to arrange signals having contractory meanings, such as "available for hire" and "off-duty" so that they cannot be operated simultaneously.

2. Description of the Prior Art

Various signalling devices for vehicles, including devices for signalling an emergency within a vehicle, have been proposed in the past. For example, U.S. Pat. No. 1,857,210 (Nelson et al.) relates to an automobile signaling device that includes a housing divided into two compartments, each of which encloses a light bulb. These bulbs may selectably be actuated to signal either left or right turns on the vehicle. A warning light, mounted on the roof of the housing and enclosed by a colored glass dome, may be lit to attract attention to the vehicle. However, the warning light is projected in all directions in a plane above the roof of the housing.

U.S. Pat. No. 2,891,140 (Huff) relates to a vehicular warning light that is recessed in the roof of a vehicle and faces rearwardly. The light is actuated by a switch mounted to be readily accessible to occupants of the vehicle.

U.S. Pat. No. 3,947,815 (Muncheryan) relates to an automobile emergency-alerting system similar to that shown in the Huff Patent, and includes a siren and a rearwardly facing warning light mounted on the trunk lid of an automobile. The light and siren are operable simultaneously through any one of a number of switches mounted inside the automobile.

Each of the vehicular emergency warning systems described in the patents mentioned above is characterized by certain drawbacks. More particularly, the systems of the Huff and Muncheryan Patents are visible generally only from the rear of the vehicle. Therefore, they are not well suited to attract attention of passersby in front of the vehicle. It is also believed that a criminal is likely to become agitated and hurried and, therefore, more likely to attack the driver if he is aware that the driver is attempting to signal for assistance. Therefore, it is believed that systems such as that shown in the Nelson Patent in which a warning light is projected in all directions laterally of the vehicle and can be readily reflected back to the interior vehicle, and that shown in the Muncheryan Patent in which a siren sounds when a warning light is operated, are not advantageous.

Still other vehicular distress or condition signalling systems are shown in U.S. Pat. Nos. 3,493,924 (Dobbins); 2,345,979 (Ivey et al.); 1,968,759 (Donner); 2,866,175 (Slater); and 1,346,567 (Stover).

SUMMARY OF THE INVENTION

It is a principal object of the present invention to provide a system for signalling various conditions of a vehicle, including an emergency occurring within it.

It is another object of the present invention to provide a system for clearly signalling an emergency within a vehicle to those outside of it that is nevertheless difficult for those within the vehicle to detect. In this way, if the emergency results from a threat to the occupants of the vehicle, it is believed that the attacker is not likely to be provoked unduly into hasty or rash behavior.

It is still a further object of the present invention to provide a system for signalling conditions of a vehicle such as a taxicab in an obvious, unambiguous way that is readily understood by passersby. More particularly, according to the system of the present invention, signals which have contradictory or mutually exclusive meanings cannot be produced simultaneously.

In accordance with the preferred embodiment, the system of the present invention comprises a main housing mountable on the vehicle at a location visible from substantially all lateral points. A warning light is mounted within the main housing and an optical system projects the generated light as a plurality of substantially collimated beams, each of which is oblique with respect to the major axis of the vehicle. The number comprising the plurality of beams is sufficiently large so that the projected light is easily visible from all locations laterally about the vehicle. However, since the collimated beams are projected obliquely with respect to the major axis of the vehicle, light is not readily reflected back toward the vehicle or, at least, is not reflected back in such quantity as to make those in the vehicle immediately aware that a warning signal is being produced. Therefore, if the driver or other occupants of the vehicle are being threatened, the attacker is less likely to be panicked or provoked into harming them.

In the preferred embodiment, the optical system includes a plurality of elongate tubular members mounted with the main housing and each having an axis that extends obliquely with respect to the major axis of the vehicle. A collimator lens is mounted between the warning light and a projecting end of each of the tubular members and the lenses and tubular members cooperate to produce the collimated beams of light.

The system in accordance with the preferred embodiment of the present invention also includes a base housing to which the main housing is fixed and a plurality of signal lights mounted in the base housing for signalling different states of the vehicle. For example, if the vehicle is a taxicab, signal lights may be provided for indicating that the cab is "available for hire", "off-duty", or on "radio call." Moreover, signal lights may be provided for indicating the directions of turns to be made by the cab.

In the preferred embodiment, circuitry prevents simultaneous operation of contradictory signals such as, in the case of a taxicab, "available for hire" and "off-duty" signals. Further, in the case of a taxicab, when the taxi meter for calculating a fare is turned off, the "available for hire" indicating light is automatically activated unless the "off-duty" indicating light has been activated.

The preferred embodiment of the present invention may also include a circuit for increasing or decreasing the intensity of the warning light when activated for daytime or nighttime use. That is, it may be desirable to decrease the intensity of the warning light for use at night to decrease the chances of it being seen by a hostile passenger of the vehicle, while it may be desirable to increase the intensity of the warning light during the day so as more reliably to be visible to passersby.

These and other objects, aspects and features of the present invention will be pointed out in, or will be understood from, the following detailed description provided below in conjunction with the accompanied drawing.

DETAILED DESCRIPTION OF THE PREFERRED EMBODIMENT

The present invention is a system for signalling conditions of, including an emergency within, a vehicle. As pointed out above, this system has particular utility in conjunction with commercial vehicles such as, for example, taxicabs where it is desirable to provide passersby with readily visible and unambiguous signals indicating the current commercial condition of the vehicle. However, the present invention may be used advantageously with any vehicle in which a medical emergency or mechanical break down might occur, and in which it is desirable to provide an indication to passersby of the emergency. Such vehicles include, for instance, armored cars and trucks, postal service vehicles, commercial trucks, passenger busses, street cars and other passenger vehicles.

While the system of the present invention may be used in many applications such as those briefly described above, for convenience, the preferred embodiment will be described as adapted for use with a taxicab.

Figure 1:
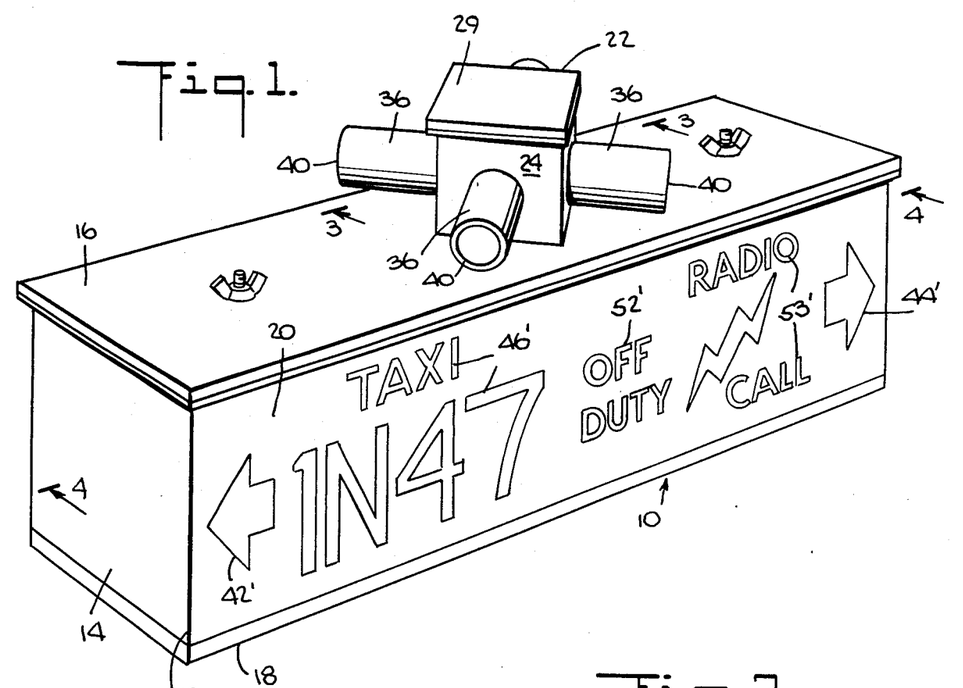
FIG. 1 is a perspective view of the system for signalling conditions of, including an emergency within, a vehicle, in accordance with the preferred embodiment of the present invention.
Figure 2:
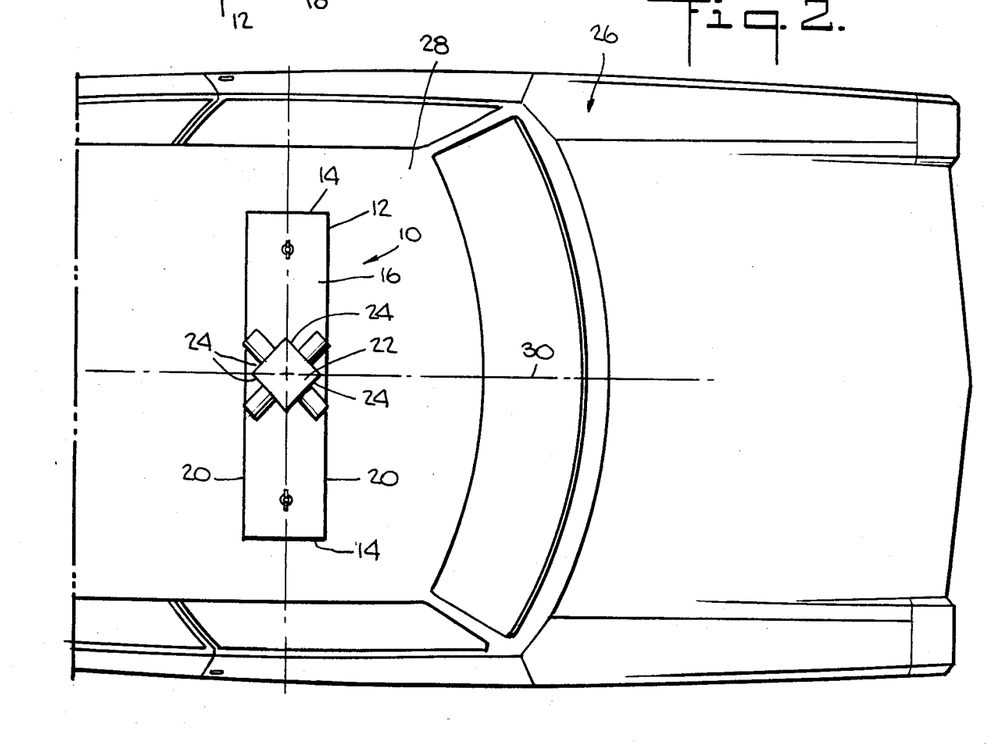
FIG. 2 is a top plan view of the system of the present invention mounted on the roof of a vehicle such as a taxicab.
Figures 3, 4:
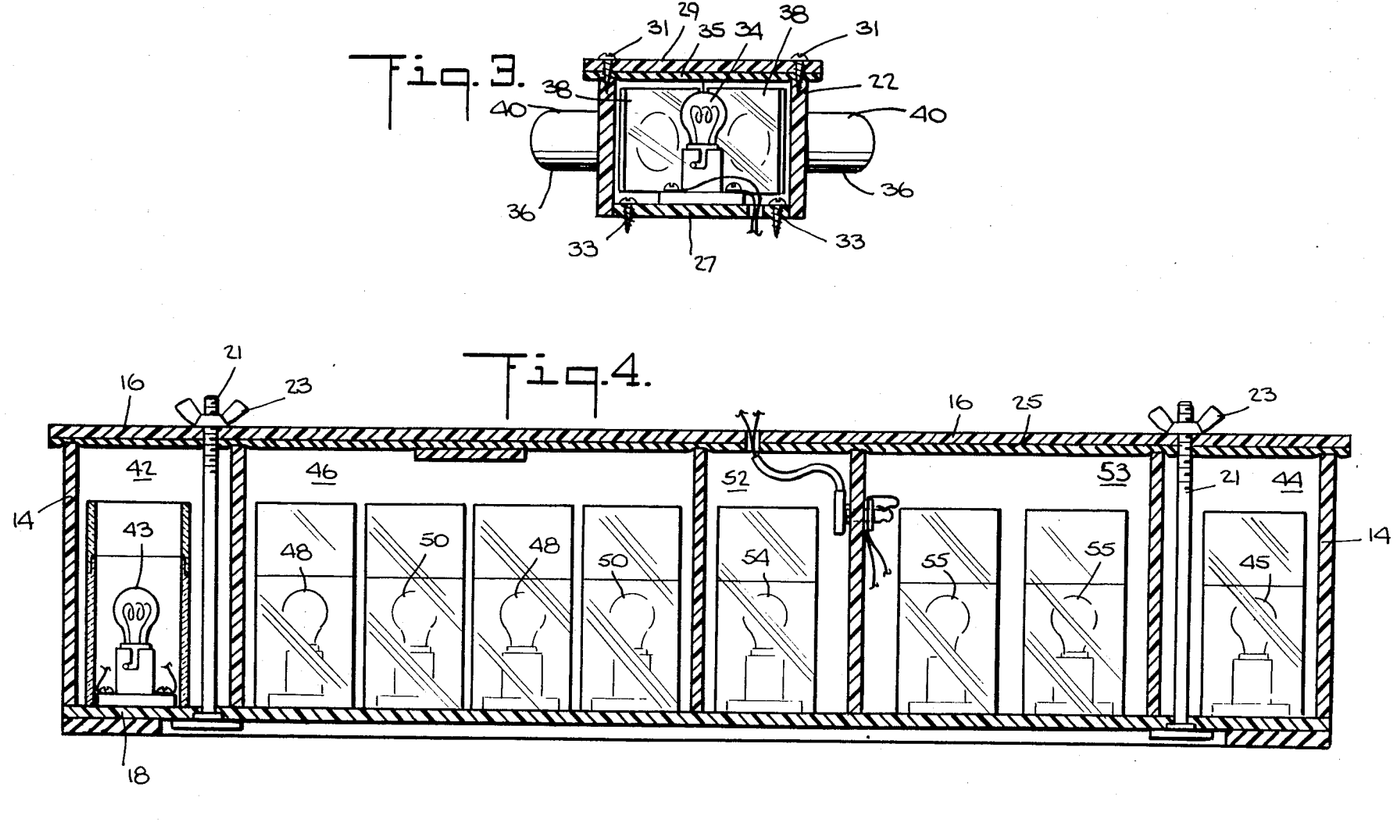
FIG. 3 is a cross-sectional view, taken on vertical plane 3—3 in FIG. 1, of the main housing enclosing the warning light of the system of the present invention.
FIG. 4 is a cross-sectional view, taken on vertical plane 4—4 in FIG. 1, showing the interior of the base housing of the system of the present invention, as well as signal lights mounted therein for indicating various conditions.

As shown in FIGS. 1 and 2, the system of the present invention for indicating conditions of a vehicle including an emergency within it, and generally indicated at 10, comprises a base housing 12 which has generally square ends 14, a generally rectangular top 16 and bottom 18, and generally rectangular faces 20. The panels comprising the bottom 18, faces 20 and ends 14 of the base housing are joined together so as to be watertight, with the top 16 being removably secured to the remainder by bolts 21 and wing nuts 23 as shown in FIG. 4. A watertight sealing gasket 25 is interposed between the top 16 and the upper edges of faces 20 and ends 14. Therefore, signal light bulbs mounted with the base housing are protected from the elements.

As shown in FIGS. 1 and 3, a main warning light housing 22 includes a floor 27 to which four lateral faces 24 are joined in a watertight manner and a roof 29 is removably attached to the upper edges of the lateral faces by screws 31. A gasket 35 is sandwiched between this roof and the upper edges to completely seal the interior of the main housing. The main housing is mounted at the center of the top 16 of the base housing 12, for example, with screws 33, and is oriented with each of its lateral faces 24 extending obliquely, and preferably at a 45 degree angle, with respect to the parallel planes of the faces 20 of the base housing 12.

The base and main housings of the system 10 are mounted on the taxicab, generally indicated at 26, at a location to be visible laterally from all points, that is from 360 degrees thereabout. As shown in FIG. 2, the housings may be mounted on the roof 28 of the cab 26 such that the faces 20 of the base housing extend perpendicularly to the major axis 30 the cab 26. Consequently, the faces 24 of the main housing 22 extend obliquely with respect to the major axis 30. (For purposes of this specification and the concluding claims, "major axis" means the longitudinal centerline of the vehicle extending between its front and its rear.)

As shown in FIG. 3, the main housing 22 encloses a warning light bulb 34 that preferably is of a bright red color or is enclosed by a red filter. An optical system also mounted with the main housing projects light generated by the warning light bulb as a plurality of collimated beams and comprises four elongate tubular members 36 each extending perpendicularly from the center of one lateral face 24 and a collimating lens 38 mounted between the warning light bulb 34 and the remote end 40 of each tubular member. Fresnel lenses, called "131-28 red baal lenses" available from Minnesota Mining and Manufacturing Company, St Paul, Minn. are suitable for use in the system of the invention as the collimating lenses. As is apparent from FIG. 2, the combination of the tubular members 36 and collimating lenses 38 causes light generated by the warning light bulb 34 to be projected as four collimated beams extending obliquely, and in particular at angles of 45 degrees, with respect to the major axis 30 of the taxicab 26. It is believed that this arrangement of four collimated beams provides a warning signal that is readily visible to passersby at any position 360 degrees laterally about the cab. However, because the collimated beams of light are not projected parallel or perpendicularly to the major axis of the cab, they are not readily reflected from objects outside of the cab back toward its interior. Therefore, it is less likely that an attacker will be aware that a warning signal is being produced than he would be with warning signal systems known in the prior art. And, it is believed that he or she is less likely to be provoked into a serious attack on the driver or other passengers of the cab than if he or she knew an emergency was being signalled by an audible or a highly visible distress indicator.

In keeping with the intent of the present invention to provide a means for generating a warning signal unobtrusively, a switch is provided in the interior of the cab that may be actuated with minimum effort by the driver or other occupants and with minimum physical movement visible from the rear seat of the cab. For example, such a switch may be mounted on the cab floor adjacent the foot pedals of the cab or under the front seat and may be any of a number of well known constructions which operate substantially silently. Moreover, this switch is a part of a circuit for operating the warning light and other signal lights in accordance with the present invention to be described in greater detail below.

The portion of the system of the invention for signalling other conditions of the cab will now be described with reference to FIG. 1. As shown there, the lateral faces 20 of the base housing 12 are generally opaque and include translucent or transparent legend portions representing conditions including commercial conditions of the cab. The translucent or transparent legend portions thus transmit light from within the base housing to provide the associated signal.

As can be seen in greater detail in FIG. 4, the respective transparent or translucent legend portions on the faces of the base housing 12 are each associated with one of five compartments into which the base housing is divided. Each compartment encloses one or more light bulbs. More particularly, as shown in FIGS. 1 and 4 the compartments 42 and 44 at opposite extremes of the housing respectively contain light bulbs 43 and 45 and are associated with the respective turn indicating legends 42' and 44' on the faces of the housing. The compartment 46 adjacent compartment 42 contains four light bulbs for illuminating the "TAXI" and identification number legends 46' which together signify that the cab is "available for hire" or "off-duty" depending on the color with which they are illuminated. That is, respective pairs of the bulbs 48 and 50 have different colors. For example, the pair of bulbs 48 may be white or green or may be enclosed by clear or green filters to indicate that the cab is "available for hire" when lit and the pair of bulbs 50 may be red or may be enclosed by red filters to indicate that the cab is "off duty" when lit.

The innermost compartment 52, associated with the "OFF DUTY" legend 52' encloses a bulb 54 that is the same color as the pair of bulbs 50 and is lit simultaneously with them.

The compartment 53 adjacent compartment 44 encloses two bulbs 55 and is associated with the "RADIO CALL" legend 53'. The bulbs 55 may be blue or may be enclosed by blue filters.

Figure 5:
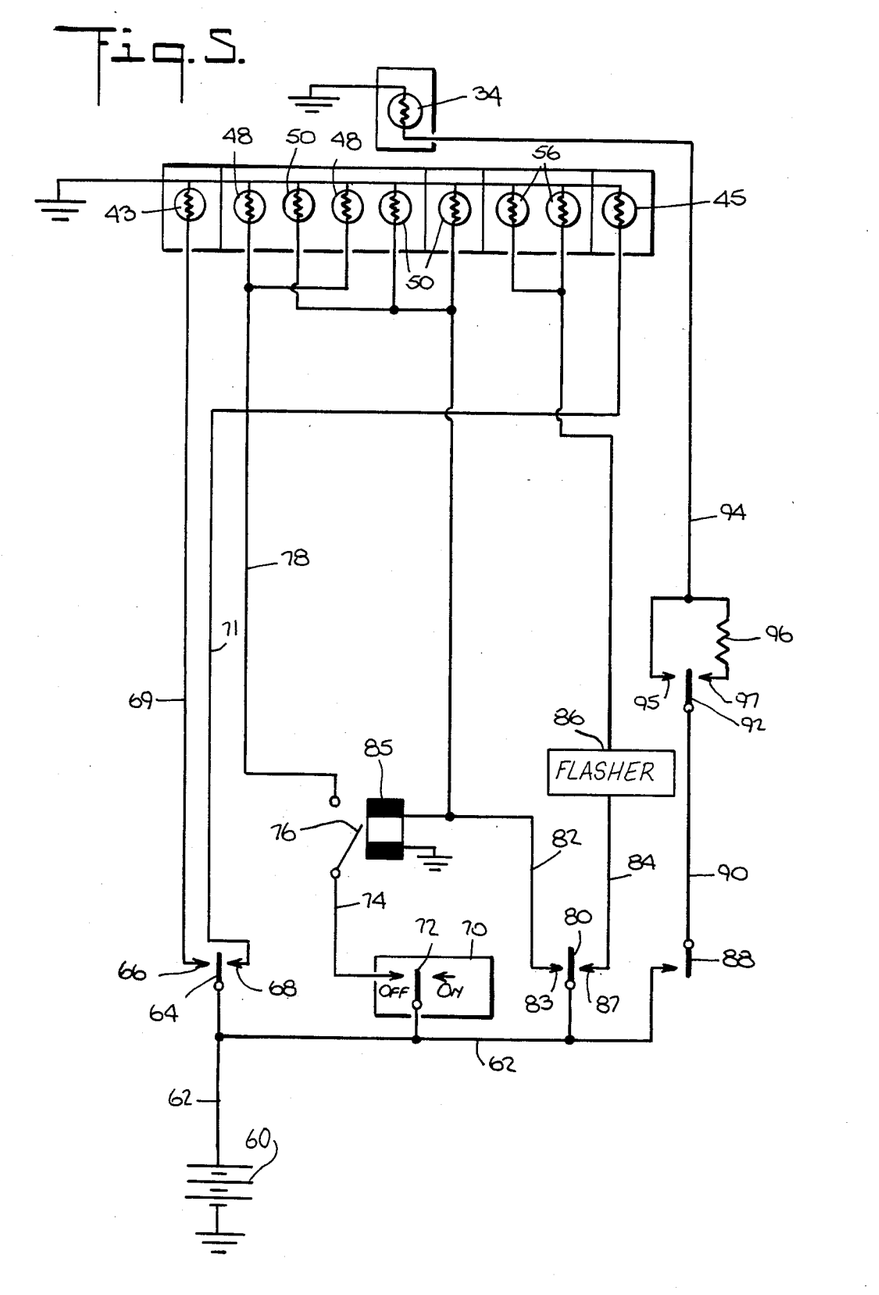
FIG. 5 is a schematic electrical diagram of the system of the present invention.

The circuit for actuating all of the bulbs described above is shown in FIG. 5 and includes a power supply in the form of a battery 60 that may also provide power for operating other electrical accessories of the taxicab. The positive terminal of the battery is connected to a line 62 and a single pole double throw switch 64, the terminals 66 and 68 of which are respectively connected through lines 69 and 71 to the "hot" terminal of one of the turn indicating bulbs 43 and 45. (The other terminal of each of the bulbs in the circuit of FIG. 5 is connected to ground, as will be easily understood by those skilled the art.) In the neutral position shown in FIG. 5, the switch 64 does not actuate either bulb 43 or 45. However, from the neutral position contacting either terminal 66 or 68, the switch can actuate either bulb selectably. As is well known, flashing circuits may be incorporated in the direction light indicating ciruits for example in lines 69 and 71.

When the vehicle is a taxicab it will ordinarily be equipped with a taxi meter 70 for automatically calculating the fare for a given trip based, for example, on distance and time of travel. The meter includes an on-off switch 72 that, when in the off position, connects the line 62 through line 74, a single pole single throw normally closed relay switch 76, and a line 78 to the "available for hire" bulbs 48.

The circuit for controlling the signal and warning lights of the system of the present invention also includes a single pole double throw switch 80 which in one operative position connects the line 62 through a terminal 83 to a line 82 and in turn to the "off duty" bulbs 50. Line 82 is also connected to the coil 85 of the relay switch 76. Since the relay switch is normally closed, the "available for hire" lights are normally actuated when the taxi meter 70 is turned off as described above. However, when the "off duty" bulbs are actuated through the switch 80, the coil 85 is energized to open the relay switch 76 and prevent the "available for hire" bulbs from being energized. Accordingly, the circuit in the system of the present invention prevents simultaneous actuation of the "available for hire" and "off duty" bulbs to prevent confusion of passersby and to convey their respective messages unambiguously.

In the other operative position of the switch 80, the line 62 is connected through terminal 87 to a line 84 to energize the "radio call" bulbs 56. The switch 80 also has a neutral position in which neither the "off duty" nor "radio call" bulbs are energized and the normally closed relay switch 76 is permitted to close.

A flasher 86 may be connected in series in line 84 to flash the "radio call" bulbs if desired.

Line 62 is also connected to a single pole single throw foot switch 88 or other switch for unobtrusively operating the warning light 34. When closed, the switch connects line 62 through line 90 to a second single pole double throw day-night change over switch 92. In a first position contacting terminal 95, the switch 92 connects line 90 directly through line 94 to the warning light bulb 34. However, in the opposite position contacting terminal 97, the switch connects through a resistor 96 of, for example, a 10 watts, 10 ohms, to line 94 and the warning light bulb 34. Accordingly, in the event of an emergency, the driver or other occupant of the vehicle may operate the foot switch 88 to illuminate the warning light. The switch 92 is provided to select high or low degrees of intensity of light emitted from the warning light respectively for day and nighttime operation. Accordingly, depending upon the time at which the vehicle is used, the day/night change-over switch 92 should be set prior to operation.

All of the switches 64, 80, and 92 may be mounted a single panel and located within the cab so they can be easily operated by the driver.

Accordingly, it will be appreciated that the system of the present invention provides a means for alerting passersby to occurrence of an emergency within a vehicle. However, if this emergency is due to an attack on the driver or other occupant of the vehicle, the warning signal is designed so as not to be readily discernible by the attacker.

Moreover, the system of the present invention provides signals of various commercial or other conditions of the vehicle which are easily understood and unambiguous. Signals that convey contradictory meanings are operable only on a mutually exclusive basis.

Therefore, although a specific embodiment of the present invention has been described above in detail, it will be understood that this is only for purposes of explanation and that modifications may be made to the described system for signalling conditions of, including an emergency within, a vehicle in order to adapt the system to particular applications.

What is claimed is:

1. A system for signalling an emergency within a vehicle, comprising:
   a main housing mountable on the vehicle at a location visible laterally from all points about the vehicle;
   warning light producing means mounted within said main housing for producing warning light;
   optical means for causing the warning light produced by said warning light producing means to be projected from said housing as a plurality of beams each of which is oblique with respect to the major axis of the vehicle, said optical means comprising a plurality of elongate tubular members mounted on said main housing each having an axis extending obliquely with respect to the major axis of the vehicle when said main housing is mounted thereon and through each of which the warning light produced by said warning light producing means is projected as one of the beams; and
   means for actuating said warning light producing means unobtrusively from within the vehicle.

2. A system according to claim 1, wherein said main housing is mountable on the roof of said vehicle.

3. A system according to claim 1, wherein said optical means further comprises a collimator lens.

4. A system according to claim 1, wherein said optical means further comprises a plurality of collimator lenses each mounted between said warning light producing means and an end of one of said tubular members.

5. A system according to claim 1, for signalling an emergency within a vehicle which is a taxicab, said system further comprising a base housing to which said main housing is fixed, a plurality of signal light producing means each mounted in said base housing for signalling different states of said taxicab, and switching means for selectively activating each of said signal light producing means from within said taxicab.

6. A system according to claim 5, wherein each said signal light producing means is of a color different from the remainder of said signal light producing means.

7. A system according to claim 5, wherein said plurality of signal light producing means comprises a first signal light producing means having either a green color or a white color for indicating that the taxicab is available for hire.

8. A system according to claim 7 wherein said plurality of signal light producing means comprises a second signal light producing means selectably operable for indicating that said taxicab is off duty and wherein said switching means comprises means for preventing simultaneous activation of said first and said second signal light producing means.

9. A system according to claim 8, further comprising power supply means and wherein said preventing means comprises a switch operable to enable and disable connection of said first signal light producing means to said power supply when said second signal light producing means is respectively deactivated and activated by said switching means.

10. A system according to claim 5, wherein said plurality of signal light producing means comprises signal light producing means for indicating that said taxicab is on radio call.

11. A system according to claim 10, where said one signal light producing means produces blue light.

12. A system according to claim 5, wherein said plurality of signal light producing means comprises signal light producing means for indicating that said taxicab is off duty.

13. A system according to claim 12, wherein said one signal light producing means produces red light.

14. A system according to claim 5, wherein said plurality of signal light producing means comprises two signal light producing means each for respectively indicating a direction in which said taxicab may turn.

15. A system according to claim 1, further comprising means for selectively increasing and decreasing the intensity of light produced by said warning light producing means.

16. A system for signalling an emergency within a vehicle, comprising:
   a main housing mountable on the roof of said vehicle to be visible laterally from all points about said vehicle;
   warning light producing means mounted within said main housing for producing warning light;
   a plurality of elongate tubular members each mounted on said main housing and having an axis extending obliquely with respect to the major axis of said vehicle;
   a plurality of collimator lenses each mounted between said light producing means and an end of one of said tubular members remote from said light producing means, said collimator lenses and said tubular members collimating light from said light producing means in a plurality of beams each projecting obliquely with respect to said major axis; and
   means for actuating said light producing means unobtrusively from within the vehicle.

17. A system to claim 16, further comprising means for selectively increasing and decreasing the intensity of light produced by said warning light producing means.

18. A signal light system for a taxicab, said system comprising:
   a housing mountable on said taxicab and including a portion laterally visible 360 degrees about said taxicab when mounted thereon;
   a plurality of signal light producing means mounted within said housing and including a first signal light producing means for selectably indicating that said taxicab is available for hire, and a second signal light producing means for selectably indicating that said taxicab is off duty;
   means for preventing simultaneous activation of said first and said second light producing means;

warning light producing means mounted within said portion of said housing for producing warning light;

optical means for projecting light produced by said warning light producing means as a plurality of beams each of which is oblique with respect to the major axis of the taxicab, said optical means comprising a plurality of elongate tubular members each mounted on said portion of said housing and each having an axis extending obliquely with respect to said major axis when said housing is mounted on said taxicab, the warning light produced by said warning light producing means being projected through each of said tubular members as one of said beams; and means for actuating said warning light producing means unobtrusively from within said taxicab.

19. A system according to claim 18, further comprising power supply means; and wherein said preventing means comprises switching means operable to enable and disable connection of said first signal light producing means to said power supply when said second signal light producing means is respectively deactivated and activated.

20. A system according to claim 19, wherein said switching means comprises:

a relay having a coil and a normally closed switch member operatively coupled to said coil that when closed forms a circuit connecting said first signal light producing means between said power supply means and ground to activate said first signal light producing means; and a switch having a switch member that when closed forms a circuit connecting both said second signal light producing means and said coil of said relay between said power supply means and ground to activate said second signal light producing means and to cause said coil to open said relay switch member to open the circuit formed thereby and disable said first signal light producing means.

21. A system according to claim 18, wherein said first signal light producing means produces white light.

22. A system according to claim 18, wherein said first signal light producing means produces green light.

23. A system according to claim 18, wherein said second signal light producing means produces red light.

24. A system according to claim 18, wherein said plurality of signal light producing means comprises a third signal light producing means for indicating that said taxicab is on radio call.

25. A system according to claim 24, wherein said third signal light producing means produces blue light.

26. A system according to claim 18, wherein said optical means comprises a collimator lens.

27. A system according to claim 18, wherein said optical means further comprises a plurality of collimator lenses each mounted between said warning light producing means and an end of one said tubular member remote from said warning light producing means.

* * * * *

UNITED STATES PATENT AND TRADEMARK OFFICE
CERTIFICATE OF CORRECTION

PATENT NO. : 4,550,304

DATED : October 29, 1985

INVENTOR(S) : JOSEPH P. SAITTA

It is certified that error appears in the above-identified patent and that said Letters Patent is hereby corrected as shown below:

Column 1, line 37, change "unambigously" to --unambiguously--; and
line 39, change "contractory" to --contradictory--.

Column 2, line 12, change "the interior vehicle" to --the interior of the vehicle--.

Column 3, line 32, change "accompanied" to --accompanying--; and
line 65, change "break down" to --breakdown--

Column 4, line 39, change "30 the cab" to --30 of the cab--.

Column 6, lines 5/6, change "skilled the art" to --skilled in the art--;
line 51, change "change over" to --change-over--; and
line 66, change "mounted a" to --mounted on a--.

UNITED STATES PATENT AND TRADEMARK OFFICE
CERTIFICATE OF CORRECTION

PATENT NO. : 4,550,304
DATED : October 29, 1985
INVENTOR(S) : JOSEPH P. SAITTA

It is certified that error appears in the above-identified patent and that said Letters Patent is hereby corrected as shown below:

Column 8, line 18, change "comprises signal" to --comprises one signal--; and line 53, change "A system to claim" to --A system according to claim--.

Signed and Sealed this

Twenty-third Day of September 1986

[SEAL]

Attest:

DONALD J. QUIGG

Attesting Officer

Commissioner of Patents and Trademarks